US010679519B2

(12) United States Patent
Kerins et al.

(10) Patent No.: US 10,679,519 B2
(45) Date of Patent: Jun. 9, 2020

(54) FLOURESCENCE TRAINING SIMULATOR

(71) Applicants: Fergal Kerins, Toronto (CA); Bradley Allan Fernald, Toronto (CA); Mohammad Kashif Siddiqui, Toronto (CA)

(72) Inventors: Fergal Kerins, Toronto (CA); Bradley Allan Fernald, Toronto (CA); Mohammad Kashif Siddiqui, Toronto (CA)

(73) Assignee: Synaptive Medical (Barbados) Inc., Bridgetown (BB)

( * ) Notice: Subject to any disclaimer, the term of this patent is extended or adjusted under 35 U.S.C. 154(b) by 221 days.

(21) Appl. No.: 15/723,264

(22) Filed: Oct. 3, 2017

(65) Prior Publication Data

US 2019/0103040 A1    Apr. 4, 2019

(51) Int. Cl.
*G09B 23/28* (2006.01)
*G09B 9/00* (2006.01)
*G09B 23/34* (2006.01)

(52) U.S. Cl.
CPC ........... *G09B 23/286* (2013.01); *G09B 9/00* (2013.01); *G09B 23/34* (2013.01)

(58) Field of Classification Search
USPC ................. 434/262, 267, 268, 272
See application file for complete search history.

(56) References Cited

U.S. PATENT DOCUMENTS

| 6,790,043 | B2 | 9/2004 | Aboud | |
| 7,008,232 | B2* | 3/2006 | Brassel | B29C 49/0042 434/268 |
| 7,419,376 | B2* | 9/2008 | Sarvazyan | G09B 23/30 434/267 |
| 8,678,831 | B2* | 3/2014 | Trotta | B29C 39/006 434/273 |
| 8,888,498 | B2* | 11/2014 | Bisaillon | G09B 23/285 434/267 |
| 9,443,446 | B2 | 9/2016 | Rios et al. | |
| 2008/0076101 | A1* | 3/2008 | Hyde | G09B 23/30 434/272 |

(Continued)

FOREIGN PATENT DOCUMENTS

WO    2015003271 A1    1/2015

OTHER PUBLICATIONS

Mondal, S.B. et al., "Real-time Fluorescence Image-Guided Oncologic Surgery," Adv Cancer Res 2014; 124: pp. 71-211.

(Continued)

*Primary Examiner* — Kurt Fernstrom
(74) *Attorney, Agent, or Firm* — Rowand LLP

(57) ABSTRACT

A anatomical phantom is disclosed containing a pathological abnormality having fluorescing properties to simulate fluorescence training and/or the simulation of medical procedures, such as fluorescence-based methods for intraoperative visualization and image-guidance. The phantom is made of materials that mimic anatomical biomechanical properties and wherein the pathological abnormality contains fluorescing properties to fluoresce in responsive to UV light excitation. The phantom may be a standalone model or may be used in a complementary simulation kit to provide a more comprehensive training approach.

4 Claims, 6 Drawing Sheets

(56) References Cited

U.S. PATENT DOCUMENTS

| | | | |
|---|---|---|---|
| 2010/0041005 A1* | 2/2010 | Campbell | G09B 23/28 |
| | | | 434/267 |
| 2010/0047752 A1* | 2/2010 | Chan | B29C 33/3857 |
| | | | 434/272 |
| 2012/0100515 A1* | 4/2012 | Hungness | G09B 23/28 |
| | | | 434/262 |
| 2012/0282584 A1* | 11/2012 | Millon | B29C 39/003 |
| | | | 434/272 |
| 2013/0059280 A1* | 3/2013 | Haverich | C12N 5/00 |
| | | | 434/272 |
| 2014/0276008 A1 | 9/2014 | Steinbach et al. | |
| 2015/0086955 A1* | 3/2015 | Poniatowski | G09B 23/28 |
| | | | 434/267 |
| 2015/0213731 A1* | 7/2015 | Sato | A61B 1/2676 |
| | | | 434/272 |
| 2016/0027341 A1* | 1/2016 | Kerins | G09B 23/34 |
| | | | 434/270 |
| 2016/0155364 A1 | 6/2016 | Piron et al. | |
| 2016/0278678 A1 | 9/2016 | Valdes et al. | |
| 2017/0249872 A1* | 8/2017 | Piron | B29C 39/02 |

OTHER PUBLICATIONS

Trustees of Dartmouth College, Thayer School of Engineering at Dartmouth, "Dartmouth Is Helping Brain Surgeons See Tumors More Clearly," <https://engineering.dartmouth.edu/news/dartmouth-is-helping-brain-surgeons-see-tumors-more-clearly> (Mar. 6, 2017) Retreived Oct. 2, 2017.

Search Report issued by the Intellectual Property Office of the United Kingdom in relation to corresponding GB Application No. GB1816045.7 dated May 24, 2019, 4 pgs.

\* cited by examiner

FLOURESCENCE TRAINING SIMULATOR

FIELD

The present disclosure relates to medical phantoms, imaging phantoms and surgical training phantoms. More particularly, the present disclosure relates to anatomical models or phantoms in which the phantom has fluorescent properties for fluorescence training and/or the simulation of medical procedures.

BACKGROUND

In the field of medicine, imaging and image guidance are a significant component of clinical care. From diagnosis and monitoring of disease, to planning of the surgical approach, to guidance during procedures and follow-up after the procedure is complete, imaging and image guidance provides effective and multifaceted treatment approaches, for a variety of procedures, including surgery and radiation therapy. Targeted stem cell delivery, adaptive chemotherapy regimes, and radiation therapy are only a few examples of procedures utilizing imaging guidance in the medical field.

Advanced imaging modalities such as Magnetic Resonance Imaging (MRI) have led to improved rates and accuracy of detection, diagnosis and staging in several fields of medicine including neurology, where imaging of diseases such as brain cancer, stroke, Intra-Cerebral Hemorrhage (ICH), and neurodegenerative diseases, such as Parkinson's and Alzheimer's, are performed. As an imaging modality, MRI enables three-dimensional visualization of tissue with high contrast in soft tissue without the use of ionizing radiation. This modality is often used in conjunction with other modalities such as Ultrasound (US), Positron Emission Tomography (PET) and Computed X-ray Tomography (CT), by examining the same tissue using the different physical principals available with each modality. CT is often used to visualize bony structures, and blood vessels when used in conjunction with an intra-venous agent such as an iodinated contrast agent. MRI may also be performed using a similar contrast agent, such as an intra-venous gadolinium based contrast agent which has pharmaco-kinetic properties that enable visualization of tumors, and break-down of the blood brain barrier. These multi-modality solutions can provide varying degrees of contrast between different tissue types, tissue function, and disease states. Imaging modalities can be used in isolation, or in combination to better differentiate and diagnose disease.

In neurosurgery, for example, brain tumors are typically excised through an open craniotomy approach guided by imaging. The data collected in these solutions typically consists of CT scans with an associated contrast agent, such as iodinated contrast agent, as well as MRI scans with an associated contrast agent, such as gadolinium contrast agent. Also, optical imaging is often used in the form of a microscope to differentiate the boundaries of the tumor from healthy tissue, known as the peripheral zone. Tracking of instruments relative to the patient and the associated imaging data is also often achieved by way of external hardware systems such as mechanical arms, or radiofrequency or optical tracking devices. As a set, these devices are commonly referred to as surgical navigation systems.

Another such example of image guided surgery includes fluorescence imaging wherein fluorescing agents are used to detect tumors and potentially other cancerous pathologies and their margins. This method can detect microscopic tumors or residual lesions that may be easily missed during surgery due to size, color, or the lack of other visual or haptically differentiable cues, and/or other factors inhibiting detectability, which may hinder the identification of a tumor or lesion and the differentiation of healthy tissue from pathological tissue.

Since image-guided surgical procedures are complex in nature and the risk associated with use of such procedures is very high, the surgical staff must often resort to performing a simulated rehearsal of the entire procedure. Unfortunately, the tools and models that are currently available for such simulated rehearsal and training exercises typically fail to provide a sufficiently accurate simulation of the procedure.

SUMMARY

The present disclosure describes a simulator that closely mimics the anatomy and contains pathological targets of interest that fluoresce in a way to mimic fluorescing agents used in clinical applications. Disclosed is a fluorescence training phantom, generally comprising an anatomical mimic and a pathological abnormality with fluorescing capability, designed to simulate a realistic fluorescence-based method for visualization and image-guidance procedures.

In one aspect, the present disclosure describes an anatomical phantom for simulating the use of fluorescing agents to aid in the visualization of pathological abnormalities. The phantom comprises an anatomical mimic constructed out of material to simulate at least one anatomical biomechanical property, and at least one pathological abnormality with fluorescing capability contained therein.

In another aspect, the present disclosure describes a method of producing a pathological abnormality with fluorescing capability. In some embodiments, the method may consist of obtaining a mold of a pathological abnormality, placing a formulation into the mold, freezing and thawing the formulation in the mold and releasing the set formulation from the mold.

In some examples, the anatomical phantom may be a standalone model or may be used in a complementary anatomical simulation kit to provide a more comprehensive training approach.

A further understanding of the aspects of the present disclosure can be realized by reference to the following detailed description and drawings.

BRIEF DESCRIPTION OF THE DRAWINGS

Embodiments will now be described, by way of example only, with reference to the drawings, in which.

Similar reference numerals may have been used in different figures to denote similar components.

DETAILED DESCRIPTION

Figure 1:
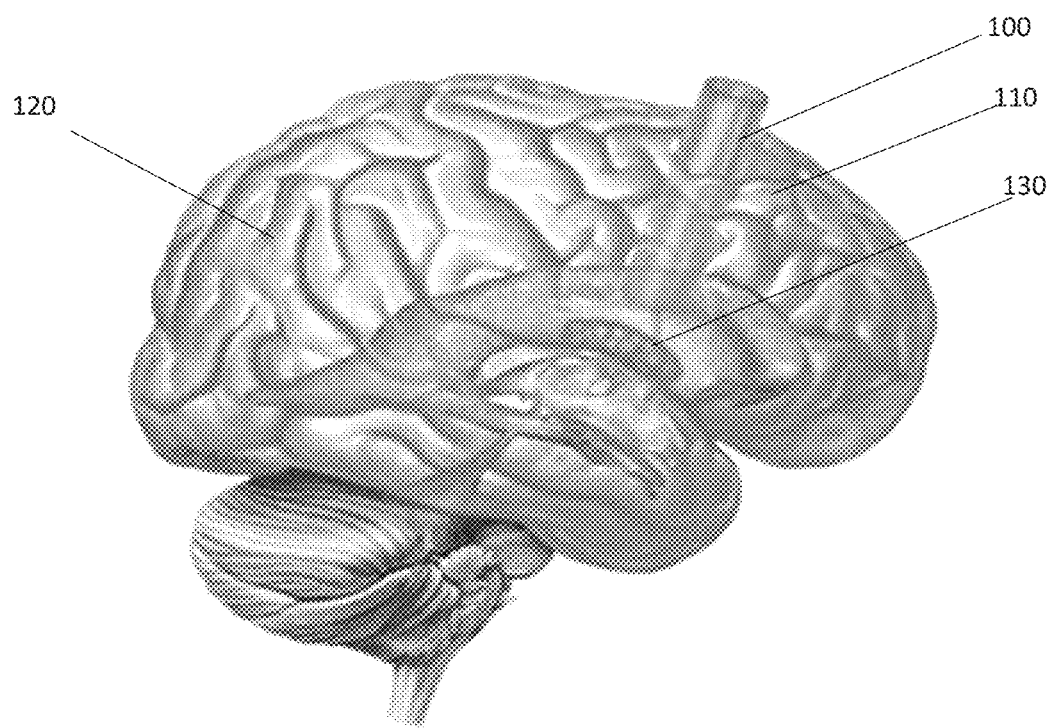
FIG. 1 is an illustration of an example port-based surgical approach. A port is inserted along the sulci to approach a tumor located deep in the brain.

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions.

As used herein, the term "patient" is not limited to human patients and may mean any organism to be treated.

As used herein, the phrase "surgical tool", "surgical instrument" or "medical instrument" refers to any item that may be directed to a site along a path in the patient's body. Examples of surgical tools may include (but are not necessarily limited to) scalpels, resecting devices, imaging probes, sampling probes, catheters, or any other device that may access a target location within the patient's body (or aid another surgical tool in accessing a location within a patient's body), whether diagnostic or therapeutic in nature.

Image guided surgery using fluorescence utilizes fluorescent dyes to detect cancerous cells during surgery, whereby the surgeon can identify and resect tumors and other cancerous pathologies. Fluorescence guided imaging allows microscopic tumors or residual lesions that may be easily missed during surgery due to, size, or other factors inhibiting detectability, to be visualized.

An example of this technique in the neurosurgical field would be the use of fluorescence, such as 5-Aminolevulinic Acid (5-ALA), as an agent for the detection of glioma tumors, and potentially other cancerous pathologies, and as a visualization aid in image-guided oncologic surgery. In many instances, the delineation between healthy tissue and pathology is not obvious. A glioma is a fast-developing tumor of the glial tissue of the nervous system that is often indistinguishable from healthy brain tissue. Typically, a complete resection of the glioma is required to extend life. 5-ALA is used clinically for tumor detection (fluorescence imaging) and treatment (tumor resection). 5-ALA is selectively taken up by the glioma, metabolized into a porphyrin (namely protoporphyrin IX (PPIX)), which, when exposed to light in the ultraviolet-visible spectral region, fluoresces, thereby aiding in the detectability of the tumor. In a tumorigenic cell, there is a greater accumulation of metabolic intermediates resulting in a markedly greater visible fluorescence of the tumor or lesion when compared to healthy tissue.

The optimal fluorescing range of 5-ALA, observed at 620-710 nm, may be achieved when exposed to UV visible light in the range of 375-440 nm.

The use of 5-ALA to aid in identifying tumor margins may lead to extended survival timelines for patients by assisting in the detection of, and resection of, a higher tumor volume. The use of 5-ALA has been found to be most commonly used in treating gliobastoma multiforme and anaphastic astrocytoma (Ferraro, N. et al., (2016) The role of 5-aminolevulinic acid in brain tumor surgery: a systematic review. Neurosurg Review 39, pages 545-555.)

Image-guided surgical procedures itself are complex procedures. When higher risk procedures are involved, such as procedures in the brain, the surgical staff often resort to performing a simulated rehearsal of the procedure ahead of time to minimize risk. Currently, the tools and models that are available for the simulated rehearsal and training exercise of fluorescence imaging and fluorescence guided surgery fail to sufficiently provide an accurate simulation of the procedure.

Understanding and modeling tissue deformations and tissue response to interventional medical instruments is important for surgeons practicing invasive medical procedures on patients. Being able to accurately model how various types of tissues deform and respond to medical instruments may improve a surgeon's ability to approach and target regions of interest in the patient's body with minimal damage and maximum effectiveness. Being able to produce tissue phantoms which exhibit biomechanical, imaging, and other relevant response characteristics resembling those of patients is a necessary step in providing a viable life-like tissue phantom on which to practice medical procedures.

A goal of tumor resection procedure is the removal of all cancerous tissue while avoiding iatrogenic damage and minimizing impact to as much of the healthy tissue as possible. Even in situations when a tumor may be readily detectable, the boundary of the tumor may not be easily discernable with unaided eyes.

The present disclosure is directed to an anatomical phantom, with realistic biomechanical properties, and compatible with surgical instrumentation, wherein various pathologies contained within the phantom mimic the fluorescent properties of tumors that have taken up fluorescing agents, similar to a clinical case, for fluorescence imaging and fluorescence guided surgical training. The fluorescing agents incorporated in the simulated pathology acts as a proxy for porphyrin and fluoresces at a similar wavelength. The fluorescing capability of the pathological tissue provides assistance in the discrimination of pathological tissue from surrounding healthy tissue.

It should be noted that while the present disclosure describes examples in the context of a developed, human brain, the present disclosure may also be applicable to other anatomical models, including other mammalian or animal brains, that may benefit from a fluorescing simulator.

It should also be noted that while the present disclosure describes a fluorescing simulator wherein a fluorescing agent, when exposed to a specific wavelength of light, fluoresces, thereby aiding in the visualization of pathological abnormalities, the disclosed simulator may also be relevant to other visualization aids and therapies, such as the use of a photosensitizing agent in photodynamic therapy. Generally, in photodynamic therapy, a photosensitive agent produces oxygen or other radicals which are cytotoxic when exposed to a specific wavelength of light, thereby eliciting cell death. Therefore, a photodynamic therapy simulator with a photosensitizing agent indicating when cell death has occurred may be a relevant application of the present disclosure.

When performing surgical and/or diagnostic procedures that involve the brain, neurosurgical techniques such as a craniotomy, or a minimally invasive procedure such as an endo-nasal surgery or a port based surgical method, may be performed to provide access to the brain. In such procedures, as indicated, the medical procedure is invasive of the head. For example, in the port-based surgical method illustrated in FIG. 1, a port (100) is inserted along the sulci (110) of the brain (120) to access a tumor (130) located deep in the brain.

According to embodiments provided herein, the simulation of such procedures may be achieved by providing a brain model that is suitable for simulating the surgical procedure through one or more layers of the head. Such a procedure may involve perforating, drilling, boring, punching, piercing, or any other suitable methods, as necessary for an endo-nasal, port-based, or craniotomy approach. For example, some embodiments of the present disclosure provide brain models comprising an artificial skull layer that is suitable for simulating the process of penetrating a skull. As described in further detail below, once the skull layer is penetrated, the medical procedure to be simulated using the training model may include further steps in the diagnosis and/or treatment of various medical conditions. Such conditions may involve normally occurring structures, aberrant or anomalous structures, and/or anatomical features underlying the skull and possibly embedded within the brain material.

The brain model is suitable for simulating a medical procedure involving a brain tumor that has been selected for fluorescence imaging and tumor resection. The brain model is comprised of a brain model having a simulated brain tumor provided therein. This brain model simulates, mimics, or imitates at least a portion of the brain at which the medical procedure is directed or focused.

The simulation of the above described medical procedure is achieved through simulation of both the surgical procedure and the associated imaging steps that are performed prior to surgery (pre-operative imaging) and during surgery (intra-operative imaging). Pre-operative imaging simulation is used to train surgical teams on co-registration of images obtained through more than one imaging methodology such as MR, CT and PET. Appropriate co-registration geometrically aligns images from different modalities and, hence, aids in the surgical planning step where affected regions in the human body are identified and suitable route to access the affected region is selected. Another use of pre-operative imaging is to train the surgical team and radiologists on optimizing the imaging parameters so that clinically relevant images are acquired prior to the surgical procedure. For example, pre-operative MR images need to be acquired in a specific manner to ensure that the acquired data can be used to generate tractography information, such as Diffusion Tensor Imaging (DTI), which shows the location and direction of the brain tracks which are not visually observable by the surgeon. Intra-operative imaging is used to guide the surgeon through accurate surgical intervention while avoiding damaging the brain tracks if possible. Surgical intervention includes accessing a previously identified affected region in the human body and subsequent resection of affected tissue.

Figure 2:
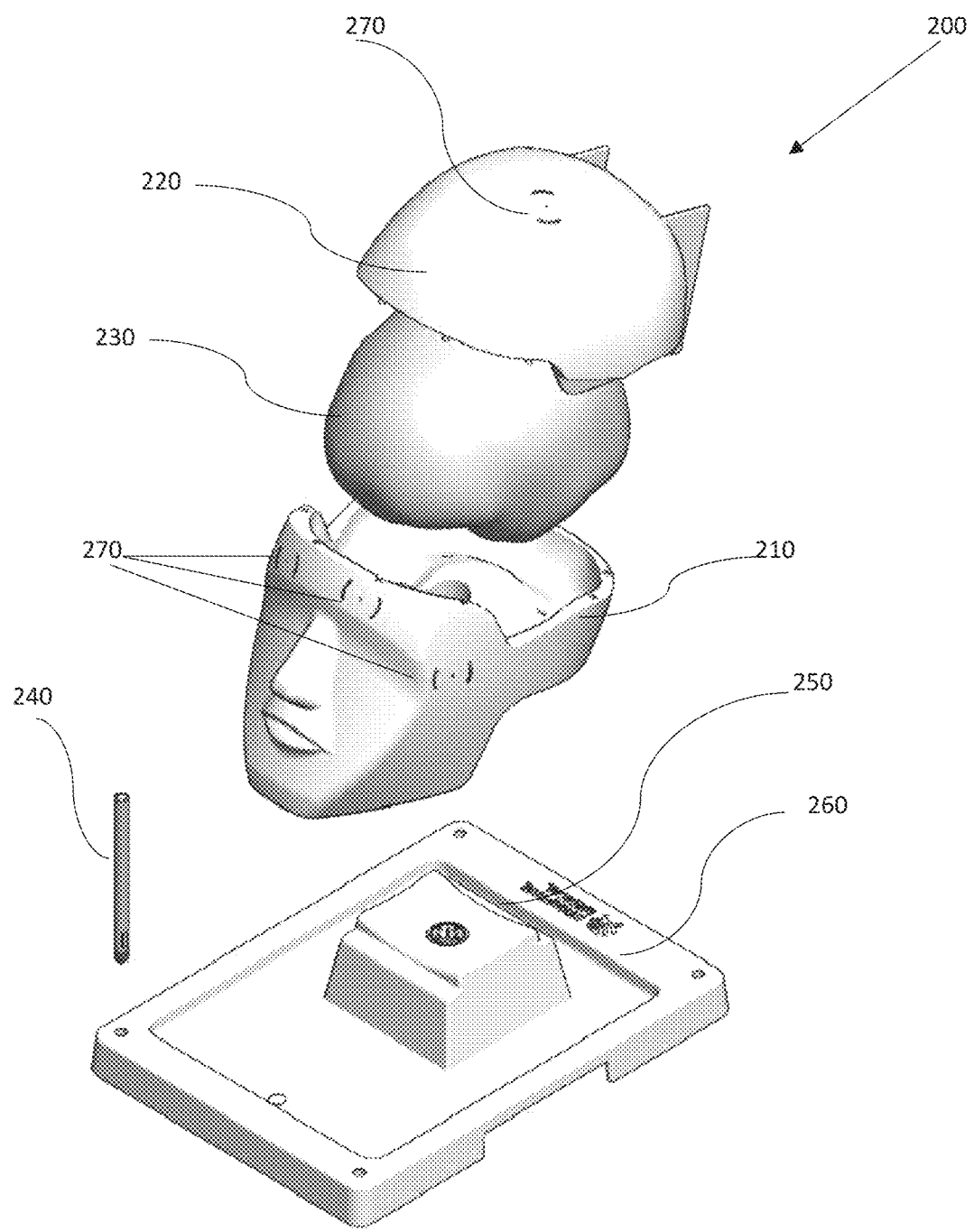
FIG. 2 is an illustration of an example training model in an exploded view, illustrating parts of the training component and the base component.
Figure 3:
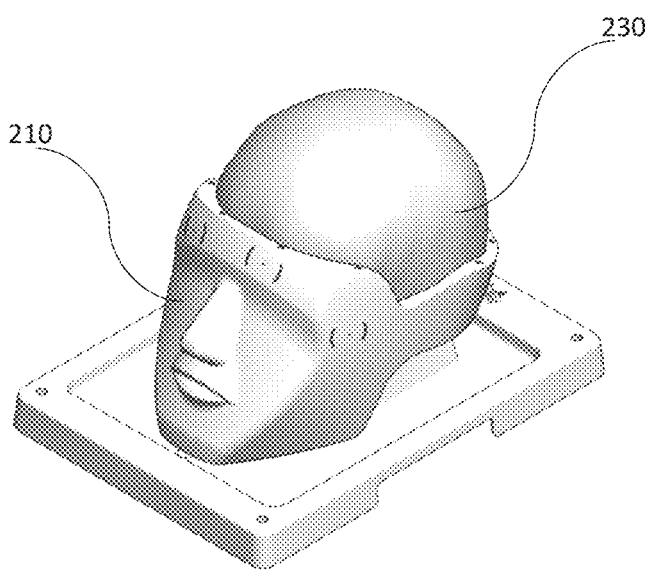
FIG. 3 is an illustration of an example showing a training component in a base component, illustrating fiducials that are important for registration of images acquired using different modalities.

Referring to FIGS. 2-3, an exploded view of an example training model shown generally at 200 is provided, that is suitable for use in training or simulation of a medical procedure which is invasive of a mammalian head. The training model 200 may be adapted or designed to simulate any mammalian head or a portion thereof. It is to be understood that the person to be trained may be selected from a wide variety of roles, including, but not limited to, a medical doctor, resident, student, researcher, equipment technician, or other practitioner, professional, or personnel. In other embodiments, the models provided herein may be employed in simulations involving the use of automated equipment, such as robotic surgical and/or diagnostic systems.

Referring now to FIG. 2, an exploded view of an example implementation of training model (200) is illustrated which includes a training component or phantom (230). The training component (230) sits in a bowl component (210) and may be capped by a skull component (220). The training component may be comprised of a brain (230) with the following layers: dura, cerebrospinal fluid (CSF), vessels, white matter, grey matter, fiber bundles or tracks, target tumors, or other anomalous structures. The training component may be comprised of a brain (230) with the following layers: dura, CSF (cerebrospinal fluid), vessels, white matter, grey matter, fiber bundles or tracks, target tumors, or other anomalous structures. The training component may also include the aforementioned skull component (220) when crafted in a skull mimicking material. Optionally, the training model (200) may also be comprised of a covering skin layer (not shown). Further, the base tray component (260) may also include a holder (240) to facilitate easy mounting of tracking markers or reference points for navigation.

Referring to FIGS. 2 and 3, the tray component (260) includes a pedestal (250) which is sized and configured for receipt of the bowl component (210). Thus, the training component (230) is sized, configured or otherwise adapted to be compatible with, or complementary to the bowl (210) and tray (260), such that the training component (230), bowl (210), and tray (260) may be assembled to provide the assembled training model (200). Likewise, the tray component (260) is adapted or configured to maintain the bowl component (210) in a relatively stable or fixed position throughout the performance of the imaging or medical procedure to be simulated. This may be accomplished with the use of a mechanical feature such as a snap mechanism that exists to affix the bowl component (210) to the tray component (260). The tray (260) may contain a trough to catch liquids, and insertion points to affix hardware to aid with image registration and/or the medical procedure to be trained.

The bowl component (210) is sized, configured or otherwise adapted to be compatible with, or complementary to the tray component (260) and the training component (230). The bowl component (210) is adapted or configured to maintain the training component (230), (which may be located under a skull component 220) in a relatively stable or fixed position through the performance of the medical procedure to be simulated. This bowl component (210) is adapted or configured to enable anatomically correct surgical positioning. This may include affixing the bowl component (210) with a surgical skull clamp or headrest, for example, a Mayfield skull clamp. This bowl component (210) is also adapted or configured to enable anatomically correct imaging position for any contemplated imaging modality, including, but not limited to, MR, CT, OCT, US PET, optical registration or facial registration. For example, the bowl component (210) may be positioned in a supine position within an MRI apparatus to enable anatomically accurate coronal image acquisition.

In some embodiments, the head component (210) is shaped or configured to simulate a complete or full skull. In some embodiments, the bowl component (210), skull (220), and training component (230) together provide a complete simulated head including skull and brain. The simulated head provided by the training model (200) enhances the reality of the overall simulation training experience.

In addition, the bowl (210) and skull (220) of the training model (200) may include one or more external anatomic landmarks or fiducial locations (270), such as those likely to be relied upon by the medical practitioner for image registration for example, touchpoints, the orbital surface, nasal bone, middle nasal concha, inferior nasal concha, occipital bone, nape, and nasal passage. These features will aid in registering the training component with the preoperative images, such as MR, CT, OCT, US, PET, so that the surgical tools can be navigated appropriately.

In this regard, navigation to establish the location of the opening or passage through the skull of the patient during the craniotomy procedure is often critical for the success of the medical procedure. Accordingly, external landmarks and/or touchpoints are provided by the simulated head in order to provide training on the correct registration of the training model with the acquired images. The anatomic landmarks and touchpoints may be utilized for attaching registration hardware, for example, a facial registration mask or fiducial landmark. Thus, the training model (200), in particular the simulated head, are sized, configured and shaped to approximate and closely resemble the size, configuration and shape and head of a patient on which the medical procedure is to be performed. In other words, the simulated head may be both "life-like" and "life-sized".

The tray component (260) may be comprised of any composition or material suitable for providing the training component receptacle, and may be suitable for being cast, molded or otherwise configured to provide or support the simulated head when assembled with the training component. For instance, the base component may be comprised of any suitable casting compound, casting composition or plaster. The tray component (260) may be comprised of a material that is rigid, non-reflective, non-ferrous, non-porous, cleanable, and lightweight, for example a urethane or acrylonitrile butadiene styrene (ABS). In addition, the bowl (210) and skull (220) components may be comprised of a material that is visible by the imaging procedure of interest to enable registration. The material for the bowl (210) and skull (220) may therefore be selected to be visible by MR, CT, and/or PET. Suitable properties for mimicking the bowl (210) and/or skull component (220) of the training component (230) for various imaging modalities are described in patent publication WO 2015/003271 A1 entitled "SURGICAL TRAINING AND IMAGING BRAIN PHANTOM" which is herein incorporated by reference.

In another embodiment, the base component may be manufactured from a material that is not visible in MR, CT and/or PET. This is particularly of value when the scope of training does not include facial registration and craniotomy. For example, it is widely known that Teflon™ may be chosen when the base component needs to be transparent in MRI. This further eliminates subsequent software processing steps where the skull structure of the head needs to be removed prior to visualizing the brain structure. This step is commonly known as skull stripping and can be computationally costly.

As shown in FIG. 3, the training component (230) and the bowl component (210) are complementary or compatible and may be mounted on the pedestal (250) on the tray (260), and together provides the training model (200). Furthermore, the configuration and dimensions of the training component (230) and the bowl component (210) are complementary or compatible such that the training component (230) may be received and fixedly or releasably mounted in the bowl component (210).

In some embodiments, in order to permit the replacement or substitution of the training component (230), the training component (230) is detachably or releasably mounted in the bowl component (210). Any detachable or releasable fastener or fastening mechanism may be used which is capable of securing the training component (230) in the receptacle, which also permitting the training component (230) to be readily detached, released or removed as desired or required. In one embedment, the training component (230) is releasably or detachably mounted within the bowl component (210), specifically the training component (230) is held within the bowl component (210) to emulate the mechanical fixation of the brain in the skull.

Thus, in an example embodiment, the training component (230) may be removed from the bowl component (210) and replaced with an alternate, replacement or substitute training component as desired or required by the user of the training model (200). For instance, a replacement training component (230) may be required where the previous training component (230) is damaged or modified during the training of the procedure. An alternate training component (230) may be adapted or designed for use in the training of the performance of a specific medical procedure or condition of the patient, allowing for the reuse of the bowl component (210).

Alternatively, the training model (200) may not include the bowl component (210). In this instance, the other components comprising the training model (200), such as the training component (230) in isolation, may be supported directly by a supporting structure or other such support mechanism (not known) that does not resemble a mammalian head. Specifically, the supporting structure may securely maintain the training component (230), without the other components of the training model (200), in the desired orientation. In such an embodiment, the training component (230) may be releasably attached or fastened with the supporting structure such that the training component (230) may be removed from the supporting structure and replaced with an alternate, replacement or substitute training component (230) as desired or required by the user.

The present disclosure is directed to an anatomical mimic with realistic haptic properties containing pathological abnormalities having fluorescing properties when exposed to UV light to simulate fluorescence training for applications such as fluorescence-based methods for intraoperative visualization and image-guidance. It should be noted that while the present disclosure describes the anatomical mimic in the form of a human brain, it may be relevant to other applications to simulate fluorescence training in other tissue models.

In some embodiments, the training component (230) may comprise a brain mimic with brain haptic properties wherein various pathological abnormalities are embedded in the brain mimic and wherein the various pathological abnormalities contain fluorescing agents fluoresces when exposed to ultraviolet light.

In another embodiment, the training component (230) may comprise a brain mimic with brain haptic properties wherein various pathologies are contained in the brain mimic and wherein fluorescing agents may be injected into the various pathological sites to fluoresce when exposed to ultraviolet light.

In yet another embodiment, the training component (230) may comprise a brain mimic with brain haptic properties wherein various pathologies having fluorescing properties may be inserted into and contained within the brain mimic.

Also contemplated is a "mixed" domain of fluorescing suspended within a non-fluorescing volume to simulate the infiltration of pathological abnormalities, such as tumors, into a region of healthy tissue. For instance, in some embodiments, the "mixed" domain may include smaller tumors dispersed within a larger region of healthy tissue and, when excited by UV light, the tumors (fluorescing volume) fluoresce through the healthy tissue (non-fluorescing volume).

In some embodiments, under white light conditions, the fluorescent marker of the pathological abnormality is silent wherein no visible fluorescence or alternative color change is apparent.

In some embodiments, the training component (230) may be constructed of 7-10% polyvinyl alcohol (PVA). For example, a brain simulator may be constructed using the materials and methods as described in patent publication WO 2015/003271 A1 entitled "SURGICAL TRAINING AND IMAGING BRAIN PHANTOM" which is herein incorporated by reference. Briefly, as an example, obtaining a mold emulating a brain, creating a PVA solution of PVA, deionized water and an antibacterial agent, placing the PVA solution into the brain mold, inducing the solution to set to form an anatomically correct brain, and releasing the brain simulator from the brain mold.

Pathological abnormalities may emulate and take on a variety of forms as desired. For example, a lesion such as a glioma, astrocytoma, or meningioma may be formed as individual units as well as metastatic regions wherein a cluster of individual units, formed separately, may be grouped together in close proximity. Further, differentiated regions within an individual unit, such as nodular regions, caseous necrotic regions and/or liquefactive necrotic regions encapsulated by a lesion may also be contemplated.

Figure 4:
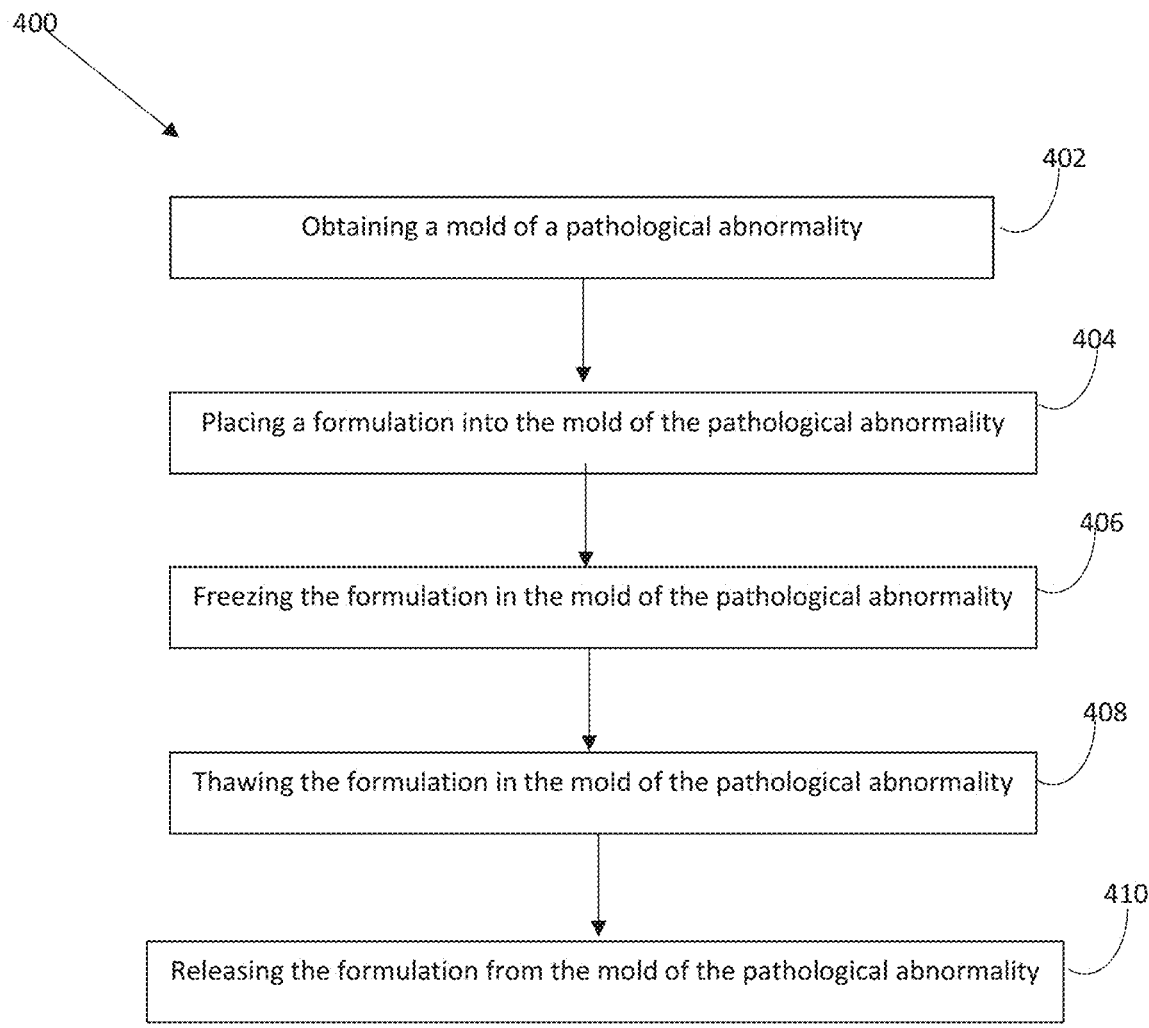
FIG. 4 is a flowchart illustrating an example method for producing a pathological abnormality with fluorescing capability.

Referring to FIG. 4, the present disclosure also describes a method (400) of producing a pathological abnormality with fluorescing capability. In some embodiments, the method may consist of obtaining a mold of a pathological abnormality (402), either through self-production or otherwise through other means. For general training purposes, a generic mold may be obtained from anatomical atlases. For patient specific training, the mold may be modelled based from preoperative images taken of a patient.

Continuing with the above embodiment, a formulation may be placed into the mold of the pathological abnormality (404), with caution to minimize the presence of air bubbles. In some embodiments, the formulation may be comprised of PVA and a fluorescing agent. The PVA may be between 6-10% concentration with an approximate molecular weight of 74,000 g/mol depending on the desired output. The selection of fluorescing agent to be used may be dependent on numerous factors such as desired fluorescence range, physical or chemical characteristic of the fluorescing agent itself, and/or physical property of the tissue model. For example, to simulate the effect of 5-ALA fluorescence, wherein emission at 620 nm-719 nm may be observed when exposed to a blue light emitting source excitation at 375 nm-440 nm, a fluorescing agent capable for mimicking these properties may be selected. For example, to simulate the fluorescence range of 5-ALA taken up by tumorigenic cells, a europium complex may be used. Europium oxide particles display an excitation from 365 nm-410 nm and a secondary strong absorption peak at 466 nm with a resulting emission around 610 nm (Feng et al., (2003) Functionalized Europium Oxide Nanoparticles Used as a Fluorescent Label in an Immunoassay for Atrazine. Anal Chem 75, pages 5282-5286). Fibrous material may be added to the PVA and fluorescing agent formulation in order to better simulate the haptic properties of the desired tissue model. Pigments, opacifers and other such aesthetic components may also be incorporated into the formulation to visually mimic the pathological tissue of interest.

Once filled, the mold containing the formulation may be subject to at least one freeze-thaw cycle. In some embodiments, the freeze-thaw cycle comprises freezing the formulation in the mold of the pathological abnormality (406) and thawing formulation in the mold of the pathological abnormality (408). Numerous freeze-thaw cycles may be undertaken to achieve the desired biomechanical property. Following the desired number of freeze-thaw cycles, the set formulation may be released by releasing the formulation from the mold of the pathological abnormality (410).

The mold may be filled with various formulations having distinguishable properties. For example, formulations of variable PVA concentrations, color, opacity, density, and content (e.g. fibrous material) may be contained within one mold.

Figure 5:
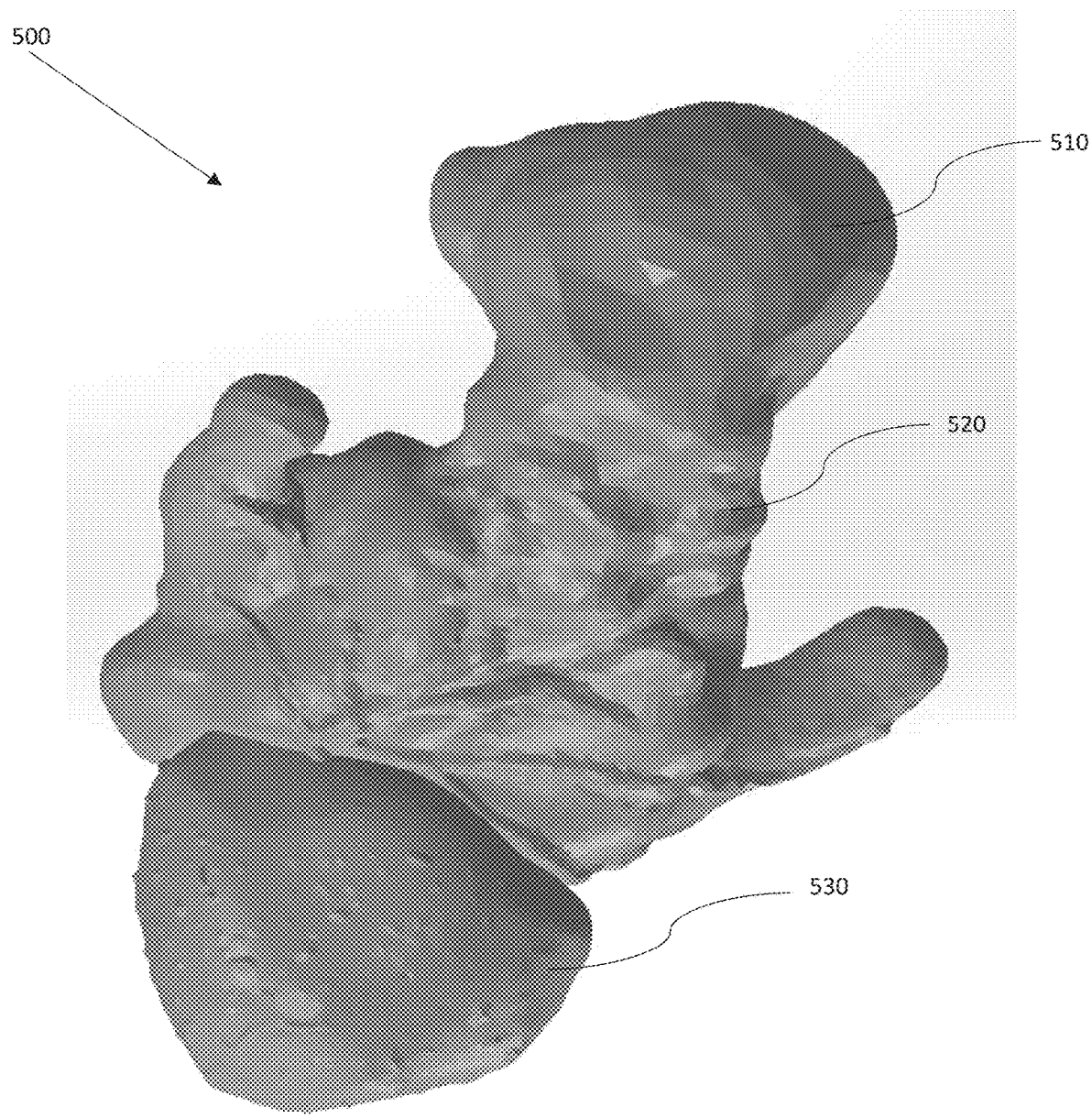
FIG. 5 is an illustration of an example of a pathological abnormality containing visually and texturally differentiated regions.

FIG. 5 illustrates, in a non-limiting example, a pathological abnormality, such as a tumor (500), containing differentiated regions. Visual and textural differences distinguish between a nodular region (510), caseous necrotic region (520) and liquefactive necrotic region (530) that may be present in a tumor (500).

As mentioned above, the pathological abnormality may fluoresce as a whole, or the pathological abnormality may comprise a "mixed" domain of fluorescing and non-fluorescing volumes. Further, the pathological abnormality may itself be comprised of a fluorescing agent or the fluorescing agent may be injected into the pathological abnormality. Additionally, the pathological abnormality may be embedded in the simulated anatomical part or may be inserted into and contained within the anatomical part.

Figure 6:
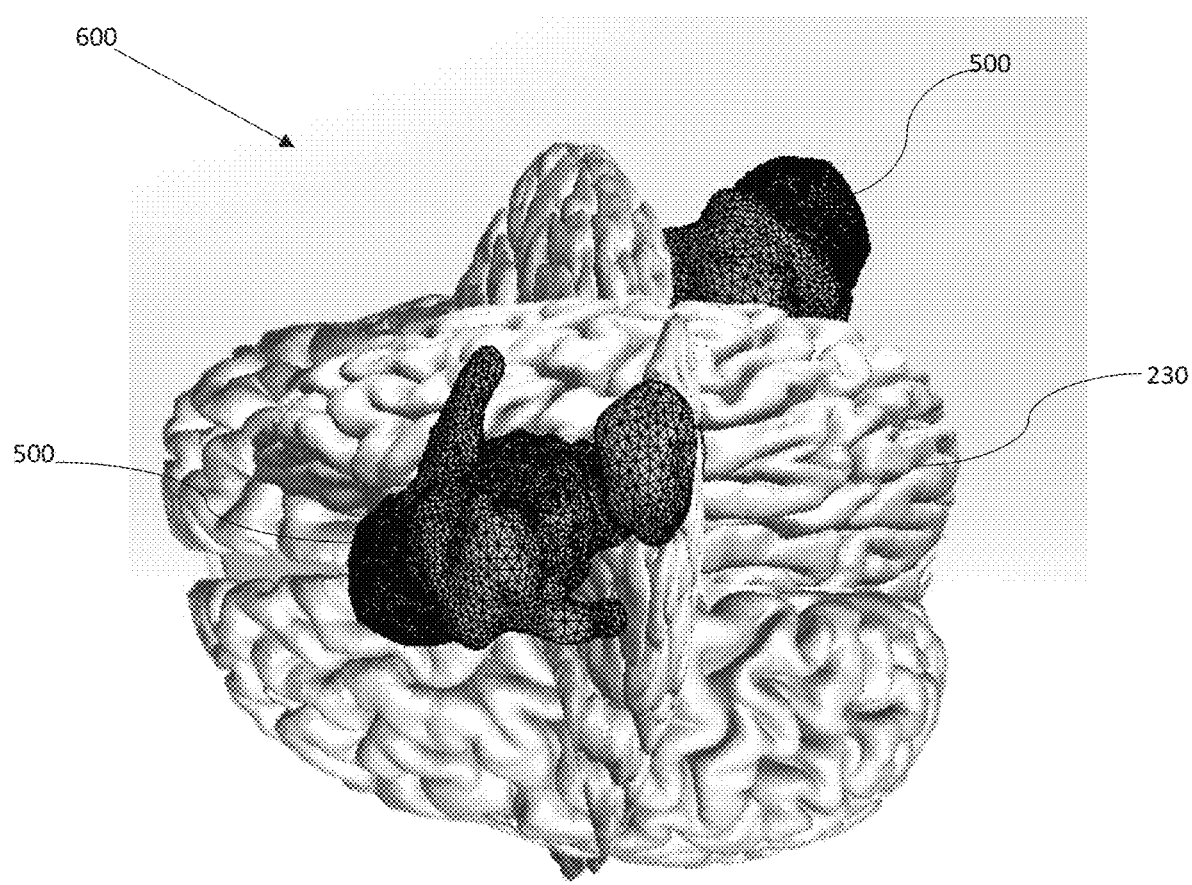
FIG. 6 illustrates, in a non-limiting example, a bird's eye view of pathological abnormalities contained within a simulated anatomical part.

In some embodiments, the pathological abnormality may be placed in the training component (230) such as a brain simulator. FIG. 6 illustrates, in a non-limiting example, a bird's eye view of a plurality of tumors contained within a simulated brain (600). For example, various pathological abnormalities, such as tumor (500) is contained within a brain simulator (e.g. training component (230)).

It is noted that numerous pathological abnormalities of various shapes and sizes may be contained within the brain simulator. For example, a sizeable tumor may be apparent in the center of the training component (230), while a smaller tumor may be located in the posterior region of the training component (230). Various miniature pathological abnormalities, such as tumors, with fluorescing capability, may also be incorporated into the training component (230) in the periphery of larger pathological abnormalities to simulate metastatic regions.

In a non-limiting example, the simulator may also be used with complementary tools, apparatus and devices to validate medical equipment. For example, the simulator may be used with planning and navigation systems and surgical robots to plan an approach and/or navigate toward a targeted region of interest for neurosurgery. More specifically, the simulator may be used by equipment having fluorescence capability wherein a user may practice the resection of a fluorescence tagged target embedded in a non-fluorescing medium.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A method of producing a pathological abnormality with fluorescing capability, the method comprising:
    obtaining a mold of a pathological abnormality;
    placing a formulation into the mold of the pathological abnormality;
    freezing the formulation in the mold of the pathological abnormality;
    thawing the formulation in the mold of the pathological abnormality; and
    releasing the formulation from the mold of the pathological abnormality;
    wherein a cycle of freezing the formulation in the mold of the pathological abnormality and thawing the formulation in the mold of the pathological abnormality is repeatable and pathological abnormality demolded in-between cycles.

2. The method of claim 1, wherein the formulation comprises a polyvinyl alcohol (PVA) solution with PVA in a range of 7% to 10% and a fluorescing agent.

3. The method of claim 2, wherein the formulation comprises fibrous material.

4. The method of claim 2, wherein the formulation comprises at least one of: pigments, opacifers, patterns, textures or visual weights.

* * * * *